United States Patent
Schork et al.

(10) Patent No.: US 8,509,818 B2
(45) Date of Patent: Aug. 13, 2013

(54) METHOD FOR SUPPRESSING USE OF A MOBILE PHONE AND PROTECTING AGAINST INTERFERENCE FIELD IN AN AREA IN A WIRELESS COMMUNICATION NETWORK

(75) Inventors: Karl Schork, Berlin (DE); Ingo Willimowski, Kamp-Lintfort (DE)

(73) Assignee: Vodafone Holding GmbH (DE)

( * ) Notice: Subject to any disclaimer, the term of this patent is extended or adjusted under 35 U.S.C. 154(b) by 40 days.

(21) Appl. No.: 12/864,444

(22) PCT Filed: Jan. 19, 2009

(86) PCT No.: PCT/EP2009/050560
§ 371 (c)(1),
(2), (4) Date: Oct. 20, 2010

(87) PCT Pub. No.: WO2009/092693
PCT Pub. Date: Jul. 30, 2009

(65) Prior Publication Data
US 2011/0045815 A1    Feb. 24, 2011

(30) Foreign Application Priority Data
Jan. 25, 2008   (DE) .......................... 10 2008 006 231

(51) Int. Cl.
*H04W 24/00* (2009.01)
(52) U.S. Cl.
USPC ..... 455/456.4; 455/418; 455/420; 455/456.6; 455/550.1; 455/414.1
(58) Field of Classification Search
USPC ........ 455/404.1–404.2, 456.1–458, 410–411, 455/417–421, 414.1, 550.1, 556.2
See application file for complete search history.

(56) References Cited

U.S. PATENT DOCUMENTS 6,163,695 A * 12/2000 Takemura .................. 455/456.4
6,167,274 A   12/2000 Smith
(Continued)

FOREIGN PATENT DOCUMENTS

EP   1435749     7/2004
WO   99/07167    2/1999

OTHER PUBLICATIONS

International Search Report; PCT/EP2009/050560; May 7, 2009.

*Primary Examiner* — Vladimir Magloire
*Assistant Examiner* — Babar Sarwar
(74) *Attorney, Agent, or Firm* — Cantor Colburn LLP (57) ABSTRACT

The invention relates to a method for suppressing use of a mobile phone network (10) in an area (15), wherein at least part of the area (15) is covered by a first position area (30), a testing unit (16) suppresses a connection (62, 62', 62') to the mobile phone network (10) for a terminal device (20,20',20') within the first position area (30) depending on at least one rule, a second position area (40) borders the first position area (30) at least in some areas, a position is determined for a terminal device (20, 20', 20') within the second position area (40), the testing unit (16) suppresses a connection (62,62',62) of the terminal device (20,20',20') at a position within the area (15) and the testing unit (16) enables a connection (62, 62', 62) of the terminal device (20,20', 20) at a position outside the area (15), a third position area (50) that borders the second position area (40) at least in some areas, and the testing unit (16) enables a connection (62, 62', 62') of a terminal device (20,20',20') within the third position area (50).

18 Claims, 3 Drawing Sheets

(56) References Cited

U.S. PATENT DOCUMENTS

| | | | |
|---|---|---|---|
| 6,343,213 B1 * | 1/2002 | Steer et al. | 455/411 |
| 6,694,143 B1 * | 2/2004 | Beamish et al. | 455/456.1 |
| 6,721,542 B1 * | 4/2004 | Anttila et al. | 455/68 |
| 6,832,093 B1 * | 12/2004 | Ranta | 455/456.4 |
| 7,039,426 B2 * | 5/2006 | Naiki | 455/456.4 |
| 7,437,168 B1 * | 10/2008 | Westfield | 455/456.4 |
| 7,707,632 B2 * | 4/2010 | Nath et al. | 726/23 |
| 7,945,167 B2 * | 5/2011 | Narkmon et al. | 398/116 |
| 2002/0077118 A1 * | 6/2002 | Zellner et al. | 455/456 |
| 2004/0228460 A1 * | 11/2004 | Keramane | 379/110.01 |
| 2005/0170849 A1 * | 8/2005 | McClelland | 455/456.4 |
| 2008/0188212 A1 * | 8/2008 | Li et al. | 455/418 |

* cited by examiner

METHOD FOR SUPPRESSING USE OF A MOBILE PHONE AND PROTECTING AGAINST INTERFERENCE FIELD IN AN AREA IN A WIRELESS COMMUNICATION NETWORK

TECHNICAL FIELD

The invention relates to a method for suppressing the use of a mobile communications network in an area. Furthermore, the invention relates to a checking unit for suppressing the use of a mobile communications network in an area.

BACKGROUND

Nowadays methods for suppressing the use of a mobile communications network are used chiefly in penal facilities (JVA), in order to prohibit the inmates of the penal facility from an uncontrolled communication with the outside world by means of a mobile phone. This goal is achieved, in particular, through the use of jammers, which suppress a communications connection between the mobile phone and the mobile communications network. The drawback has turned out to be that jammers of this type produce an interference field that can be delimited in terms of space only with difficulty. Thus, in particular, the residents who live in the vicinity of the penal facility are restricted in their possibilities for using the mobile communications network.

BRIEF SUMMARY

The invention provides a method that is intended for suppressing the use of a mobile communications network and that avoids the aforementioned drawbacks and at the same time has minimal effects on the provision of mobile communications services in an area outside the penal facility.

The invention more particularly provides a method for suppressing the use of a mobile communications network in an area, where at least a part of the area is covered by a first position area, a checking unit suppresses a connection to the mobile communications network for a terminal device inside the first position area as a function of at least one rule, a second position area borders the first position area at least in some regions, a position is determined for a terminal device inside the second position area, the checking unit suppresses a connection of the terminal device at a position inside the area and the checking unit enables a connection of the terminal device at a position outside the area, a third position area borders the second position area at least in some regions, and the checking unit enables a connection of a terminal device inside the third position area.

In accordance with the method according to the invention, the terminal device communicates with the mobile communications network. This communication can run unidirectionally and/or bidirectionally, but in any case results in the mobile communications network becoming aware of the terminal device. The goal of this communication is to establish in general a connection to the mobile communications network by means of the terminal device. Then this connection serves to transmit voice data or any other information from a user of the terminal device to the mobile communications network. At this point the invention provides that the checking unit registers in which of the three position areas the terminal device is located. The resulting specific position of the terminal device is not automatically tied to a geographical location. Rather it is sufficient to know that the terminal device may be found at any location in one of the three position areas. Depending on in which of the three position areas the terminal device is located, the checking unit executes the additional steps that are described in the method according to the invention. Therefore, the simplest course is the one that is taken for a terminal device inside the third position area. In this case a direct connection between the terminal device and the mobile communications network is enabled. Consequently a user of the terminal device can communicate with another terminal device via the mobile communications network. If the checking unit detects that the terminal device is in the first position area, then the connection to the mobile communications network is suppressed as a function of a rule. This rule is determined beforehand and stipulates when a connection shall be established and when it shall not. At the same time the geographic position of the terminal device inside the first position area has in general no impact on the rule. Rather the rule is a pre-determined selection criterion regarding the subscriber. If, in contrast, the terminal device is in the second position area, it no longer suffices to find the position of the terminal device. On the one hand, the second position area has, according to the invention, regions, in which a connection shall be suppressed, and, on the other hand, regions, in which a connection shall be enabled. If, for example, the area, in which the use of the mobile communications network shall be suppressed, is a penal facility, then the second position area would be arranged, for example, in the region around the outer walls. For an inmate inside the penal facility, the method according to the invention shall ensure that this inmate cannot establish a connection to the mobile communications network. However, the use of terminal devices shall not present a problem to those users who live in the vicinity of the penal facility. Therefore, the method according to the invention finds the exact geographic position of the terminal device inside the second position area. The position to be determined no longer involves the position of the terminal device—inside or outside the position area—but rather the exact geographic point, at which the terminal device may be located. With this information the checking unit determines whether the terminal device may be found inside or outside that area in which the use of the mobile communications network shall be suppressed.

The term mobile communications network is defined, in particular, as a telecommunications network that is constructed for handling telephone conversations. In such a mobile communications network the receiver and, in principle, also the transmitter can be incorporated in a mobile manner. In this respect the communication in a mobile communications network comprises all communications by water, on land and in the air. The communication extends from the private sphere with a wireless telephony (CT and DECT) and Bluetooth, over all mobile communications networks for voice communications (GSM, UMTS, 4G), the trunked radio, private or professional mobile radio and paging up to satellite communications. In accordance with the method and according to the checking unit of the invention, the terminal device can be at least one of the following: a mobile telephone, a PDA, a computer, a notebook or a PCM-CIA (Personal Computer Memory Card International Association) modem.

Modern mobile communications networks often exhibit a highly granular architecture. The actual terminal device makes contact with a base station via an air interface. Often a plurality of base stations are monitored by a land station controller (for example, BSC, Base Station Controller and/or RNC, Radio Network Controller). The combination of base stations and land station controllers is generally called the access network. In this case the access network includes all of the functionalities that are necessary for producing radio access on the physical level. This access network in turn is connected to a core network. The core network serves to manage the subscribers including their authentication, the accounting of the services and the management of the mobility of the terminal devices. In addition, this access network serves as the contact point with hardwired units of the mobile communications network. The method according to the invention shall be applicable to current and future mobile communications networks. However, for ease of comprehension, the description will often include references to components that are used in GSM (Global System for Mobile Communications) and/or UMTS (Universal Mobile Telecommunications System) networks.

This approach is not to be construed as a restriction, but rather serves only to elucidate the individual components.

One advantageous design variant of the method according to the invention is characterized in that the first position area is spanned by at least a first base station, the second position area is spanned by at least a second base station, and the third position area is spanned by at least a third base station. If the area to be monitored involves, for example, a detached, stand-alone penal facility (JVA), then in this advantageous design variant a first base station can be set up at a central site inside the penal facility. Thus, it is ensured that terminal devices that are inside the penal facility will be connected preferably to this first base station. The monitoring of the second position area is facilitated by arranging additional second base stations around the grounds of the penal facility. Thus, it is conceivable, for example, to assign a second base station to each of the longitudinal sides. This arrangement would have the advantage that only the second base stations, which span the second position area, would have to carry out the exact position finding of the terminal device. Furthermore, it would be defined from the beginning that, for example, the third or the first base station would not have to carry out the position finding of the terminal device. This variant has proven to be especially advantageous if the area to be covered has a large area. Depending on which mobile communications standard is used—GSM or UMTS—the first and/or the second and/or the third base station can be at least one of the following: a BTS (base transceiver station) or a Node B.

In accordance with the method of the invention, the checking unit of the communications network can communicate with the terminal device. In this way a connection is set up between the checking unit and the terminal devices, so that the checking unit can determine inside which of the three position areas the terminal device is located. In accordance with this design variant the checking unit is integrated directly in the connection setup of the terminal device with the mobile communications network. In order to implement this design variant, it has proven to be advantageous if each base station has a checking unit.

As an alternative, an additional advantageous configuration of the method according to the invention makes it possible to integrate the checking unit in a core network of the mobile communications network. In this case the checking unit is no longer installed into one of the decentralized components of the access network. Rather the core network has a checking unit and receives from the components of the access network and accordingly to the base stations the necessary information for carrying out the method according to the invention. Hence, there are two distinct variants. In the first variant the checking unit receives information about the position area in which the terminal device may be found and then decides which of the additional process steps will have to be initiated. As an alternative, the second variant offers the possibility that the position unit receives information about the actual location of the terminal device and then has to decide in which position area this terminal device is located. This central arrangement of the checking unit has the advantage that even large areas, which include a plurality of base stations/land station controllers, can be monitored by means of a checking unit.

If the area to be monitored has only a limited area, then it has proven to be advantageous not to integrate the checking unit into the core network, but rather into a part of the access network. In this case it is especially useful to insert the checking unit into a BSC (Base Station Controller) or RNC (Radio Network Controller) of the mobile communications network. Because in general one of the said land station controllers monitors a plurality of base stations, which can span all three position areas. Thus, the checking unit stays in the local vicinity of the area to be monitored. In this case at least the first and/or the second and/or the third base station are connected preferably to the BSC and/or the RNC. However, it is possible to connect the first and the second and the third base station to the BSC or the RNC.

In accordance with the method of the invention, the terminal device can intercept a signaling channel before setting up the connection. This signaling channel serves the purpose of transmitting information about the mobile communications network to the terminal device. In this respect it has proven to be advantageous if the first and/or the second and/or the third base station send information about the mobile communications network over the signaling channel. If a terminal device is activated, then this terminal device can intercept the signaling channel. The resulting information that is received enables the terminal device to make any adjustments that are necessary in order to make a connection to the mobile communications network. Thus, for example, any frequencies which are intercepted by the base stations and which enable a connection can be transmitted over the signaling channel. It is advantageous for the first and/or the second and/or the third base station to send over the signaling channel network-specific parameters, such as runtime and synchronization information. It has turned out to be especially advantageous if a part of the signaling channel is a broadcast control channel (BCCH). The BCCH is a control channel, over which the base station beams data unidirectionally over a GSM network.

In accordance with the method of the invention, the connections of the terminal device to the mobile communications network are suppressed inside the first position area as a function of at least one rule. The type of rule that tends to a selection of the terminal device, whose connection to the mobile communications network shall be allowed or suppressed, often depends on the use of the area to be monitored. Thus, the rule can allow only a maximum number of terminal devices that can connect to the mobile communications network. Similarly it is conceivable that a connection is suppressed or processed as a function of the type of terminal device. It has been demonstrated to be advantageous if in accordance with the rule an identification code of the terminal device is compared with a list. In particular, the list can comprise the identification codes of the terminal devices, for which a connection to the mobile communications network is to be enabled. If the terminal device attempts to set up a connection, the identification code is sent to the checking unit by the terminal device. This checking unit investigates whether the identification code is on the list. If this is the case, then a connection of the terminal device to the mobile communications network is enabled in accordance with the invention.

As an alternative, it is conceivable that for the terminal device whose identification code is on the list, a connection to the mobile communications network will be suppressed.

It is advantageous for the operator of the mobile communications network to issue an identification code to the terminal device. So that the identification code is associated unambiguously with the terminal device, it has proven to be advantageous if the identification code is an IMSI (International Mobile Subscriber Identity). The IMSI is an international mobile communications subscriber number that is issued internally in the network and noted on a SIM card of a terminal device. The IMSI serves to identify the terminal device during the handling and signaling of a call. As an alternative, it is also possible that the identification code has a MSISDN (Mobile Subscriber Integrated Service Digital Network Number). The MSISDN is assigned to the terminal device and/or the user of the terminal device by the mobile communications network operator. With the MSISDN it is possible for a third party to make contact with the terminal device via the mobile communications network in the course of setting up a connection. Since this information is also sent by the terminal device to the mobile communications network, it is possible for the checking unit to compare the IMSI or the MSISDN with the pre-entries on the list and to enable or suppress accordingly the connection setup.

In accordance with the method of the invention the position of the terminal device is found advantageously according to at least one of the following methods: determination of the cell ID, location area code (LOC), timing advance (TA), U-TDOA (Uplink Time Difference of Arrival), network supported GPS, OTDOA (Observed Time Difference of Arrival), OTDOA-IPDL (Observed Time Difference of Arrival-Idle Period Downlink) or OTDOA software blanking. In the cell ID method the position is found by means of the identification number of the radio cell that is currently used for supplying the terminal device. This method is often used by network operators for location based services, because it can be used without any investment in the infrastructure and with any available mobile cellular phone. In addition, the network operator knows the necessary position of each base station. Since the maximum radius of a radio cell around a base station is approximately 35 km, the exact position can be found up to about 70 km. In congested urban areas with a high density of base stations, the accuracy can be increased to a few hundred meters. This method can also be used by the mobile cellular phone without the support of the network, because many terminal devices allow the cell ID of the base station that is being used at the moment to be read out.

The GSM mobile communications system operates with a TDMA (Time Division Multiple Access) system with a time slot length of 0.577 ms. Since the system has to operate synchronously, the mobile terminal devices are synchronized with the BTS. Therefore, a timing advance (TA) value is sent by the BTS, with which the terminal device can compensate the runtime delays owing to the distance between the base station and the mobile terminal device. The maximum value of this TA can be 233 µs, divided into 63 steps, which equals a resolution of 6 bits. As a result, the intervals of the TA amount to 233 µs/63=3.7 µs. Assuming that the speed of light amounts to c=300,000 km/s, then the distance per bit of the TA value is approximately 550 m. Thus, the area coverage of a GSM radio cell can be divided into 550 m wide rings around the base station.

The GSM mobile communications system offers, as another form of localization, the U-TDOA (Uplink Time Difference Of Arrival), which is mentioned in 3GPP TS 43.059. In this method the arrival times of known signals of the terminal device are measured by special units (Location Measurement Unit, LMUs) in the network. Then the position of the terminal device can be found by means of the time differences and the known geographic position of the LMUs. The signals are the access bursts, which are sent by a mobile terminal device during an asynchronous handover (=radio cell exchange) and which are received by multiple measurement units, of which the position has to be known. As a result, it is possible to achieve an accuracy ranging from 50 to 200 meters.

In accordance with another advantageous design variant the position of the terminal device is determined by measuring at least one network variable (also network parameter or network measurement value). It is advantageous if the network variable is a field strength and/or a signal strength and/or a runtime. The network variable that is determined in this way can be used to find the position of the terminal device inside the area. In this case it has proven to be especially advantageous if not only an individual network variable, but also a plurality of network variables are determined. In particular, the terminal device can be used to determine a network variable for all those base stations that are received by the terminal device. Thus, the terminal device can determine, for example, the field strength of the signals emitted by all of the receivable base stations and can send said signals back to the network. For implementation purposes the method according to the invention uses the measurement of the network variables that was carried out in the mobile communications networks. In accordance with a GSM network the terminal device continuously sends a measurement report to the base stations. This measurement report also contains, besides the measurements regarding the signal quality of the currently used cell and accordingly the base station, the field strength of the six adjacent cells. The measurement reports are sent every 480 ms to the network over a channel that is used especially for this purpose. A particular advantage of the use of the measurement report in the GSM network lies in the fact that in the event of an attempt to suppress the transmission of the measurement report, the connection is immediately terminated. This termination occurs because the GSM Radio Resource Management uses an incorrectly received measurement report inside a SACCH (Slow Associated Control Channel) as the criterion for terminating the radio connection. Given the information about the network variables, the checking unit can find the position of the terminal device.

An additional advantageous design variant provides that in order to find the position of the terminal device inside the second position area, the propagation effects, which influence the network variables at the current position of a terminal device, are used for localization. If a terminal device receives several base stations, then the result is a characteristic signal vector for the measured network variable. This characteristic signal vector can be compared with the measurements and/or the simulations of the propagation situation of the network variable. The starting point of this process is that at least one network variable for a plurality of base stations is measured at a plurality of locations inside the second position area. The result is a grid of measurement points, at which a network variable for a plurality of base stations was measured. Each of the resulting tuple of values for the measured network variable is associated unambiguously with a location inside the second position area. Then in a next step the measured network variables can be filed in a table as a function of the location. At this stage the invention provides that the terminal device for a plurality of base stations measures at least one network variable and transmits the signal vector, which was determined in this way, to the mobile communications network and/or the checking unit, where then a comparison of the measured network variable is made with the signal vectors in order to draw conclusions about the position of the terminal device.

Since, in particular, GSM networks measure the signal strength of the base stations in the context of the measurement report and send this information to the network, this information can be used to find the position of the terminal device. In this case the only additional requirement is a measurement and accordingly a simulation of the signal strength that is to be expected inside the second position area. By combining the measurement of real data with a model of the second position area it is possible to find the position of a terminal device with an error tolerance ranging from 50 to 250 m.

In one advantageous embodiment the measurement of the network variable can be carried out by means of the terminal device after the passage of a period of time. In this case the timespans between 0.1 second and 2 seconds have proven to be especially useful. Furthermore, it has been demonstrated to be preferable for the measurement of the network variable to be initiated by the checking unit. In this way it is ensured that in any case in which a terminal device would like to communicate with the mobile communications network and is located inside the second position area, the checking unit can query the required signal vector at any time for the purpose of finding the position. It has turned out to be especially preferred if the command, which is sent to the terminal device by the checking unit, is a part of a SIM toolkit (SIM Application Toolkit, SAT). The SAT is a manufacturer-independent interface between the terminal device and a SIM card and enables a server side, such as network operator or provider, to personalize the mobile terminal devices and accordingly their SIM card by means of JAVA applications embedded in the SMS (Short Message Service) messages and to expand so as to include additional features. At the same time the SIM card can also communicate with the server via SMS.

The method according to the invention utilizes the fact that both in the case of GSM and UMTS the terminal devices continuously send measurement reports, which contain an inventory of the receivable cells, including their field strengths. To this end it is not necessary that the terminal device be actively located in the radio cell, which marks the area to be suppressed. It suffices that the receptability of the radio cell is guaranteed. In order to detect the transition from the outside into the area, the latter can form its own location and/or routing area. In this way it is guaranteed that in the event of a change a measurement report is sent automatically to the mobile communications network. Hence, one possibility is a respective interface between the access network and the core network as the initiator for a localization. In the event that a location area and/or routing area is changed, the core network is reliably signaled with updated information. In order to minimize the complexity of more exact localization, it is advantageous to group the location areas and accordingly the routing areas in a hierarchical manner around the area, such as a penal facility. A more accurate evaluation of the location has to be carried out, according to the invention, only in the area of the "unclear" second position area. The smaller the local expansion of the "unclear" second position area can be selected, the less complicated it is to process the localization data for a uniform subscriber density/area.

Furthermore, the method can be integrated into a CAMEL structure (Customized Applications for Mobile network Enhanced Logic). The CAMEL structure makes it possible to define services that exceed the existing standardized services of GSM and UMTS. A call admission control can suppress, based on the information of the marked radio cell, undesired mobile communications traffic and/or allow the undesired mobile communications traffic to go through. This suppression can be achieved with a CAMEL structure that permits intervention in the call handling (circuit switched and packet switched) and processing by SMS. The call handling capacity of the method can be optimized by skillfully setting the system parameters, like the cell size, frequency of location updates and measurement reports as well as the memory-based plausibility check.

In addition, it has turned out to be advantageous if the method according to the invention is carried out in a mobile communications network that is operated according to at least one of the following standards: 4G, UMTS (Universal Mobile Telecommunications System) and/or GSM (Global System for Mobile Communications).

Another advantageous design variant of the method according to the invention provides that the method comprises the following steps:
   the terminal device measures the field strength of at least one of the first, the second or the third base station at the position of the terminal device,
   the terminal device sets up the connection to a selected base station, where the selected base station is that of the first, the second or the third base station that exhibits the greatest field strength.

In accordance with the described design variant it is advantageously possible that the first base station generates the highest field strength for a terminal device inside the first and/or the second position area, so that the terminal device establishes the connection to the first base station.

An additional advantageous design variant of the method according to the invention provides that a computer inside the first or the second or the third base station decides whether the communication connection that is set up by the terminal device shall remain. The computer supplements and accordingly executes instructions of the checking unit.

The engineering object of the invention is also achieved by means of a checking unit for suppressing the use of a mobile communications network in an area, the checking unit having a communications means and an evaluation means, so that a connection to a terminal device can be set up by means of the communications means, and the evaluation means can determine the location of the terminal device in a first, second or third position area in such a manner that
   the checking unit suppresses, as a function of at least one rule, a connection to the mobile communications network for a terminal device inside the first position area, where at least a part of the area is covered by the first position area,
   a position can be determined for a terminal device inside the second position area, the checking unit suppresses a connection of the terminal device at a position inside the area, and the checking unit can carry out a connection of the terminal device at a position outside the area, where the second position area borders the first position area at least in some regions,
   the checking unit can carry out a connection of the terminal device inside the third position area, where the third position area borders the first position area at least in some regions.

The features and details that were described in conjunction with the method according to the invention also apply, as a matter of fact, to the checking unit according to the invention.

It has been demonstrated to be especially advantageous to operate the inventive checking unit according to one of the above described methods.

BRIEF DESCRIPTION OF THE DRAWINGS

Other advantages, features or details of the invention are described in the following description, in which the embodiments of the invention are explained in detail with reference to the drawings. In this respect the features that are disclosed in the claims and in the description can be essential to the invention either individually or in any combination.

DETAILED DESCRIPTION

The purpose of the method according to the invention consists of impeding the use of the services of a mobile communications network 10 in an area 15. This type of method can be used, for example, to suppress undesired mobile communications traffic inside penal facilities. This strategy is supposed to prevent the inmates of the penal facility from communicating with the outside world, in order to ensure that no unlawful activities can be conducted from the penal facility.

Figure 1:
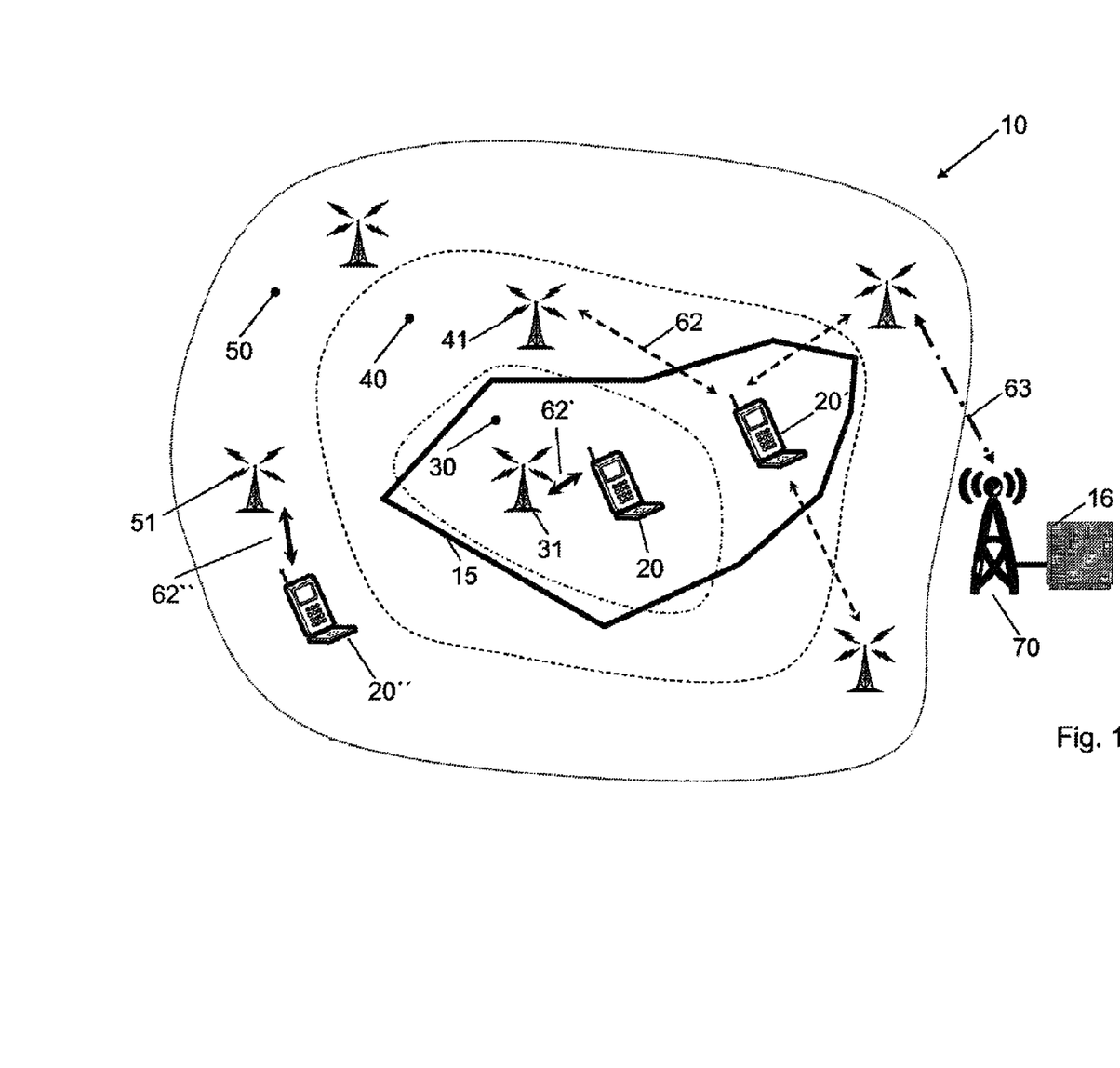
FIG. 1 shows an area, inside of which the inventive method for suppressing the use of a mobile communications network is used.

In accordance with the method according to the invention, communications of a terminal device 20 with a mobile communications network in an area 15 shall be suppressed. To this end there is an inventive checking unit 16 that is integrated in the mobile communications network 10. Depending on the application it has proven to be advantageous to integrate the checking unit 16 in a core network or an access network of the mobile communications network 10. FIG. 1 shows that the checking unit 16 is connected to a land station controller 70—in the following also BSC. This BSC 70 manages a plurality of base stations that span a plurality of position areas 30, 40, 50. At the same time the function of the BSC 70 includes allocation of radio frequencies, a connection handover between individual base stations, as well as establishing a connection to a fixed network of the mobile communications network 10. If at this point a user of a terminal device 20 tries to set up a communications connection 62' to the mobile communications network 10, the communications means of the BSC 70 are used to this end. A location means, which is integrated into the BSC 70, checks whether the terminal device 20 is located in a first 30, second 40 or third position area 50. As FIG. 1 shows, the first position area 30 covers at least a part of the area 15, in which the use of the mobile communications network 10 is to be suppressed. In this case said first position area 30 is spanned by a first base station 31. A connection 62' between the terminal device 20 and the first base station 31 can be established via an air interface. In so doing, the geometric size of the first position area 30 is not in conformity with that of the area 15 to be monitored. Rather there exist peripheral regions, in which a communication of a terminal device 20 with the mobile communications network 10 cannot be handled via the first base station 31. This region is covered by the second position area 40. A terminal device 20', which is located in this second position area 40, can set up a connection 62 with a second base station 41. In this case the second base station 41 spans the second position area 40, which surrounds the first position area 30 in the illustrated embodiment. Said second position area 40 borders a third position area 50, where a terminal device 20" sets up a connection with a third base station 51. Depending on the size of the third position area 50, this area can be spanned by a plurality of third base stations 51—in FIG. 1 four. All of the base stations 31, 41, 51 are monitored by the BCS 70 and are connected to the checking unit 16 via said BCS.

Figure 2:
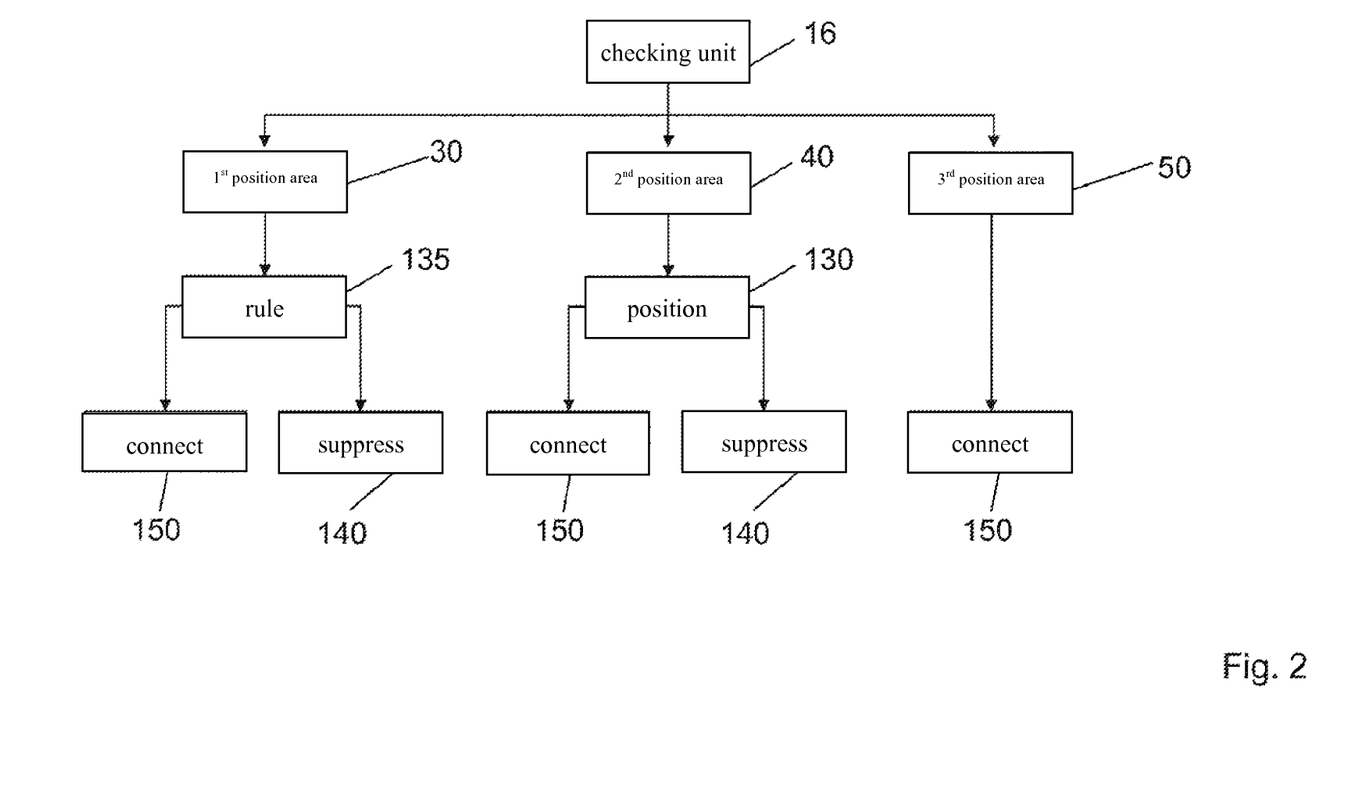
FIG. 2 shows a flow chart for a graphical rendering of the method according to the invention and FIG. 3 is an enlarged detail from FIG. 1 in order to elucidate a position finding in accordance with the method of the invention.
Figure 3:
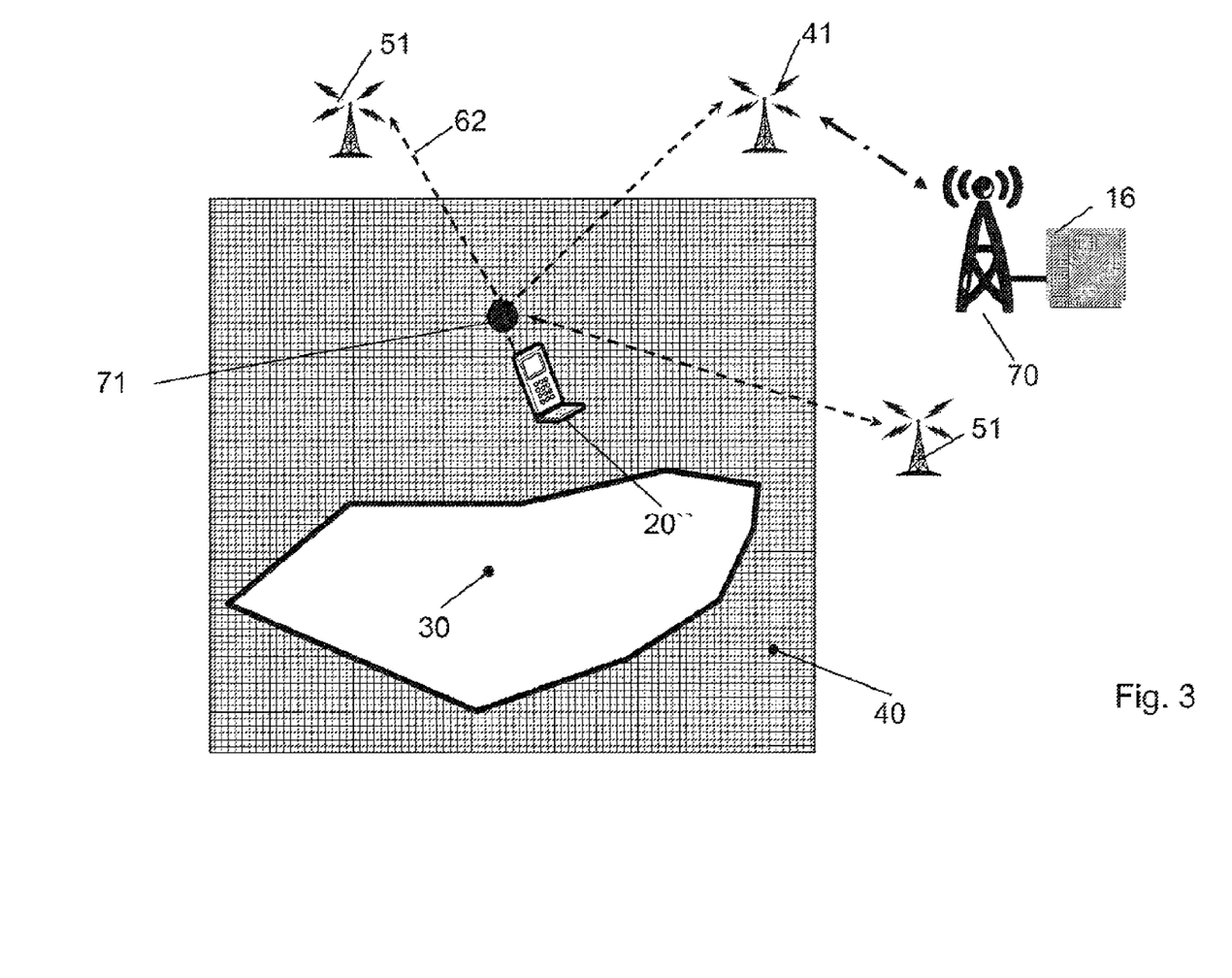

The individual process steps of the method according to the invention shall be elucidated by means of the flow chart depicted in FIG. 2. If the checking unit 16 receives the information that the terminal device 20 inside the first position area 30 is trying to set up a connection 62' with the mobile communications network 10, then this connection 62' is suppressed as a function of at least one rule 135. Normally each connection of a terminal device 20, which is located inside the area 15, could be automatically suppressed. In the example that the area 15 is a penal facility, it may be the case, however, that perhaps a warden is supposed to be able to continue to use the terminal device 20 in order to communicate with the mobile communications network 10. In order to enable this communication, the invention introduces the rule 135. In accordance with the rule 135 an identification code of the terminal device 20, 20' can be compared with a list, and, in so doing, a connection 62 of the terminal device 20, 20' with the mobile communications network 10 can be enabled. It has been demonstrated to be advantageous for this identification code to have an IMSI and/or a MSISDN. This number can be entered into the list beforehand so that it is possible, for example, for a prison official to establish at any time communications with the mobile communications network 10 even from inside the penal facility. Working on this basis, the flow chart in FIG. 3 shows the possibility of either suppressing 140 or enabling 150 a connection to the mobile communications network 10 as a function of the rule 135.

If, in contrast, the checking unit registers that the terminal device 20" is located in the third position area 50, then the terminal device 20 is automatically connected 150, at the request of the user, to the mobile communications network 10. As a result, it is possible for any person located outside the area 15 to set up a connection 62" with the mobile communications network 10.

Since the geometric adjustment of the size of the first position area 30 to the geometric shape and size of the area 15 is possible only with much effort, and, in particular, in the peripheral regions of the first position area 30 it is possible to find the position of the terminal device 20 only with extreme difficulty, it does not suffice to suppress exclusively those connections that are set up with the first base station 31. Therefore, the invention provides that the second position area 40 borders the first position area 30 at least in some regions. As FIG. 1 shows, the second position area 40 is arranged predominantly in the peripheral regions of the area 15. Consequently it is those parts of the area 15, in which just a small change in position is enough to be either inside or outside the area 15. One example is, for instance, a sidewalk that runs along a penal facility. A user, who is walking along on this sidewalk, would like to communicate in an unimpeded manner with the mobile communications network 10. At the same time, however, it must be ensured that an inmate of the penal facility, who is only a few meters away behind the wall, cannot set up a connection 62' with the mobile communications network 10. This situation is guaranteed, according to the invention, through the interaction between the checking unit 16 and the second position area 40. The checking unit 16 according to the invention suppresses 140 a connection of the terminal device 20', when it has a position inside the area 15. In contrast, the checking unit 16 enables a connection 62 of the terminal device 20' at a position outside the area 15.

Hence, in accordance with the method of the invention the exact position of the terminal device 20, 20' has to be determined only in those cases in which it is located inside the second position area 40. Both in the first 30 and in the third position area 50 it suffices totally if the checking unit 16 receives the information that the terminal device 20, 20" is in these position areas 30, 50. It does not need any information about where inside the first 30 and accordingly to the third position area 50 the terminal device 20, 20" is exactly localized. Since a position finding 130 is necessary only for such terminal devices 20' that are located inside the second position area 40, the requirements imposed on the checking unit 16 and accordingly to any evaluation means that find the location of the terminal device are sharply reduced.

In order to find the position of the terminal device 20, 20', 20", there are a plurality of possibilities. One possibility that has proven to be especially advantageous is to compare, as shown in FIG. 3, the signal vectors of the terminal device 20" with the previously measured network variables 71. For greater ease of understanding, FIG. 3 shows only the first position area 30 and the second position area 40. In the illustrated embodiment the terminal device 20" has a position inside the second position area 40. Consequently the exact position has to be found in accordance with the method of the invention. In order to enable this position finding, the terminal device 20" measures at least one network variable 71 and transmits this network variable 71 to the checking unit 16 and accordingly to the mobile communications network 10. Then the measured network variable 71 is used by the mobile communications network 10 and accordingly to the checking unit 16 to find the position of the terminal device 20 inside the second position area 40.

In GSM mobile communications networks the terminal device 20" determines the field strength of a plurality of reachable base stations in order to measure the signal quality. In this way the terminal device 20 can determine whether it has set up a connection 62 with the respectively strongest base station 41. The information about the network variable 71—thus, the field strength—is transmitted to the mobile communications network 10 and accordingly to the checking unit 16 within the framework of a measurement report (MR). This signal strength vector is typical of the location of the mobile terminal device 20". To increase even more the accuracy of the position finding, a measurement and/or a simulation of the second position area 40 can be carried out first. During the measurement the network variable 71 for a plurality of base stations 41 is measured along a coordinate grid. Then the resulting values of the network variable 71 can be filed in a table with the respectively assigned locations in the second position area 40. If at this point the checking unit 16 receives an MR, then the signal strength vector can be read out and compared with the network variable 71 that was measured at the start. In this way it is possible to find with a high degree of precision the current position of the mobile terminal device 20" inside the second position area 40.

The use of the MR for finding the position is advantageous insofar as that the attempt to suppress the transmission of the measurement report in GSM networks results in the connection being immediately aborted. Thus, even the attempt to render the position finding by the checking unit 16 difficult could not result in the suppression of the connection setup in accordance with the method of the invention being overcome.

The invention claimed is:

1. Method for suppressing use of a mobile communications network in an area, the method comprising:
    at least a part of the area being covered by a first position area,
    a checking unit suppresses a connection to the mobile communications network for a terminal device inside the first position area as a function of at least one rule,
    a second position area borders the first position area at least in some regions,
    a position is determined for a terminal device inside the second position area,
    the checking unit suppresses a connection of the terminal device at a position inside the area and
    the checking unit enables a connection of the terminal device at a position outside the area,
    a third position area borders the second position area at least in some regions, and
    the checking unit enables a connection of the terminal device inside the third position area, wherein
    the first position area is spanned by at least a first base station, the second position area is spanned by at least a second base station, and the third position area is spanned by at least a third base station, and
    the position is determined for the terminal device only when the terminal device is inside the second position area.

2. Method, as claimed in claim 1, wherein the first and/or the second and/or the third base station is one of the following: a BTS (Base Transceiver Station) or a Node B.

3. Method, as claimed in claim 1, wherein the checking unit is integrated in a core network of the mobile communications network, and such that the checking unit is integrated in a BSC (Base Station Controller) or RNC (Radio Network Controller) of the mobile communications network, and at least the first and/or the second and/or the third base station are connected to the BSC and/or the RNC such that the first and the second and the third base station are connected to the BSC or the RNC.

4. Method, as claimed in claim 1, wherein prior to the set up of the connection, the terminal device intercepts a signaling channel that the first and/or the second and/or the third base station send over the signaling channel.

5. Method, as claimed in claim 4, wherein the first and/or the second and/or the third base station send network-specific parameters over the signaling channel and the signaling channel is a broadcast control channel (BCCH).

6. Method, as claimed in claim 1,
    wherein, in accordance with the rule, an identification code of the terminal device is compared with a list, and the connection to the mobile communications network is enabled with an identification code that is filed in a list.

7. Method, as claimed in claim 6,
    wherein the identification code exhibits an IMSI (International Mobile Subscriber Identity) and/or an MSISDN (Mobile Subscriber Integrated Service Digital Network Number).

8. Method, as claimed in claim 1,
    wherein the position of the terminal device is found according to one of the following methods: determination of the cell ID, location area code (LOC), timing advance, U-TDOA (Uplink Time Difference of Arrival), network supported GPS, OTDOA (Observed Time Difference of Arrival), OTDOA-IPDL (Observed Time Difference of Arrival-Idle Period Downlink) or OTDOA software blanking.

9. Method, as claimed in claim 1,
    wherein the position of the terminal device is determined by measuring at least one network variable, and the network variable is a field strength and/or a runtime.

10. Method, as claimed in claim 9,
wherein the terminal device measures the network variable, the terminal device transmits the network variable to the mobile communications network, and the mobile communications network uses the network variable to find the position of the terminal device, and, the position of the terminal device is determined in the checking unit.

11. Method, as claimed in claim 9,
wherein at least one of the network variables for a plurality of base stations is measured inside the second position area at a plurality of locations.

12. Method, as claimed in claim 11,
wherein the terminal device for a plurality of base stations measures at least one network variable, and the terminal device transmits the network variables to the mobile communications network and/or the checking unit, and the network variables are compared with the measured network variables in order to find the location.

13. Method, as claimed in claim 9, wherien the measurement of the network variable is carried out by means of the terminal device after the passage of a period of time, and wherein the network variable is transmitted to the mobile communications network in the framework of a report.

14. Method, as claimed in claim 9,
wherein the measurement of the network variable is initiated by the checking unit, and the measurement of the network variable is initiated by a command of the checking unit to the terminal device, and wherein the command is a part of a SIM toolkit (SIM Application Toolkit).

15. Method, as claimed in claim 1,
wherein the method is integrated into a CAMEL structure (Customized Applications for Mobile network Enhanced Logic).

16. Method, as claimed in claim 1,
wherein the mobile communications network is operated according to at least one of the following standards: 4G, UMTS (Universal Mobile Telecommunications System) and/or GSM (Global System for Mobile Communications).

17. Checking unit for suppressing use of a mobile communications network in an area, the checking unit comprising: a communications means and an evaluation means,
a connection to a terminal device configured to be set up by means of the communications means,
the evaluation means configured to determine the location of the terminal device in a first, second or third position area in such a manner that
the checking unit suppresses, as a function of at least one rule, a connection to the mobile communications network for a terminal device inside the first position area, where at least a part of the area is covered by the first position area,
a position configured to be determined for a terminal device inside the second position area,
the checking unit configured to suppress a connection of the terminal device at a position inside the area, and the checking unit configured to carry out a connection of the terminal device at a position outside the area, where the second position area borders the first position area at least in some regions,
the checking unit configured to carry out a connection of a terminal device inside the third position area, where the third position area borders the second position area at least in some regions, wherein
the first position area is spanned by at least a first base station, the second position area is spanned by at least a second base station, and the third position area is spanned by at least a third base station, and
the position is determined for the terminal device only when the terminal device is inside the second position area.

18. Checking unit for suppressing use of a mobile communications network in an area, the checking unit comprising: a communications means and an evaluation means,
a connection to a terminal device configured to be set up by means of the communications means,
the evaluation means configured to determine the location of the terminal device in a first, second or third position area in such a manner that
the checking unit suppresses, as a function of at least one rule, a connection to the mobile communications network for a terminal device inside the first position area, where at least a part of the area is covered by the first position area,
a position configured to be determined for a terminal device inside the second position area,
the checking unit configured to suppress a connection of the terminal device at a position inside the area, and the checking unit configured to carry out a connection of the terminal device at a position outside the area, where the second position area borders the first position area at least in some regions,
the checking unit configured to carry out a connection of a terminal device inside the third position area, where the third position area borders the second position area at least in some regions, wherein
the first position area is spanned by at least a first base station, the second position area is spanned by at least a second base station, and the third position area is spanned by at least a third base station, and
the position is determined for the terminal device only when the terminal device is inside the second position area, and
said checking unit is operable according to the method as claimed in claim 1.

* * * * *